United States Patent [19]

Killip et al.

[11] Patent Number: 4,693,124

[45] Date of Patent: Sep. 15, 1987

[54] TEMPERATURE CONTROLLING APPARATUS FOR USE WITH PORE VOLUME AND SURFACE AREA ANALYZERS

[75] Inventors: Graham R. Killip, Doraville; Ronnie W. Camp, Duluth; Clyde Orr, Jr., Dunwoody, all of Ga.

[73] Assignee: Micromeritics Instrument Co., Norcross, Ga.

[21] Appl. No.: 833,079

[22] Filed: Feb. 25, 1986

[51] Int. Cl.[4] .............................................. G01N 1/28

[52] U.S. Cl. .............................. 73/863.11; 62/514 R; 62/373; 62/64

[58] Field of Search ............ 73/863.11, 864.91, 865.5, 73/866, 38; 62/514 R, 514 JT, 373, 64; 374/208

[56] References Cited

U.S. PATENT DOCUMENTS 3,357,256 12/1967 Burch .............................. 73/863.11

3,555,912 1/1971 Lowell .

3,850,040 11/1974 Orr, Jr. et al. ..................... 73/865.5

4,269,608 5/1981 Sisti et al. .

OTHER PUBLICATIONS

Hare, James D., *Performance of a Nitrogen Heat Pipe with Various Capillary Structures,* Jun. 1975, pp. 1-9, 37-38, 61, 69, 80-82.

Adt, Jr., R. R., *Irreversible Thermodynamic Analysis of the Axially Heated Heat Pipe,* 1970, pp. 326-327, 335; 6th, S.E. Seminaron Thermol Science Proceedings.

Edwards, D. K., Denny, V. E., and Mills, A. F., *Transfer Processes, An Introduction to Diffusion Convection and Radiation,* 1973, pp. 68-73.

*Primary Examiner*—Tom Noland

*Attorney, Agent, or Firm*—Jones, Askew & Lunsford

[57] ABSTRACT

An apparatus for maintaining a constant temperature within a vessel immersed in a liquid by surrounding a portion of the vessel, extending above the surface of the liquid, with a wick. The wick conducts liquid up to a predetermined point on the vessel and maintains the liquid at that point, regardless of changes in the level of the liquid due to evaporation. The wick is encased within a layer of heat insulating or heat conducting material to further aid in maintaining a constant temperature within the vessel. A second embodiment, including alternating layers of heat conducting and heat insulating material, is disclosed for increased temperature control. The disclosed apparatus is particularly useful for maintaining a constant temperature within a vessel attached to a scientific instrument, such as a pore volume and surface area analyzer.

33 Claims, 3 Drawing Figures

TEMPERATURE CONTROLLING APPARATUS FOR USE WITH PORE VOLUME AND SURFACE AREA ANALYZERS

TECHNICAL FIELD

The present invention relates to apparatus for controlling the temperature within a vessel, and more particularly relates to a wick apparatus.

BACKGROUND ART

It is often desired to analyze laboratory samples under fixed conditions of temperature and pressure in scientific experiments. In a typical scientific laboratory environment, temperature fluctuations occur at random. Various devices such as temperature controlled water baths, incubators and refrigeration rooms have been employed in an attempt to combat these fluctuations; however, these devices are expensive and cannot maintain extremely low or extremely high temperatures.

Analyses which must be performed at cryogenic temperatures are often conducted within a bath of liquid nitrogen. Liquid nitrogen boils at room temperature making frequent replacement of the evaporated liquid necessary. In lengthy experiments this need for constant replacement is often inconvenient.

An additional problem encountered in the analysis of samples under cryogenic conditions is that, if a sampe being analyzed is contained within a vessel, and only a portion of the vessel is immersed in the liquid, a temperature gradient is produced within the vessel above the sample. The bottom of the vessel, in contact with the liquid, is at the cryogenic temperature, but the gases within the non-immersed portion of the vessel become progressively warmer as the top of the vessel is approached, even if the vessel is a closed container. The gradient exists because the air outside the vessel ranges from a very low temperature, near the evaporating cryogenic liquid, to ambient temperature at a particular height above the cryogenic liquid. These gradations in temperature affect primarily the portion of the vessel not submerged in the liquid. The air outside the vessel, immediately above the surface of the cold liquid, is cold because it contains cold gaseous molecules formed from the evaporating liquid. These cold gaseous molecules are warmed by adjacent air molecules and become dispersed in accordance with the second law of thermodynamics, so that, the farther a gas molecule rises from the surface of the liquid, the warmer it becomes. The heat from the warmed gas and air molecules outside the vessel is conducted through the walls of the vessel to the gases contained within the vessel. Therefore, the temperature of the gases within the vessel is not constant and the continuing evaporation of the cryogenic liquid increases the length of the temperature gradient.

The need for a static environment is critical during the measurement of the surface area and pore volume of a solid sample. The measurement of surface area and pore volume is often determined by instruments which obtain points for a BET curve, such as shown in U.S. Pat. No. 3,850,040. Small pressure changes in the gases within a vessel surrounding a sample at constant temperature are measured as part of the determination of surface area and pore volume values. An accurate reading of pressure can only be made under conditions of non-fluctuating temperature, most frequently a stable cryogenic temperature, because uncontrolled changes in temperature create uncontrolled changes in pressure. This can lead to errors in the measured amount of gas adsorbed by the sample.

Several prior devices have been developed to maintain gases at a constant temperature within a vessel. In one device, the cryogenic liquid is contained within a Dewar flask, and the entire flask is raised at the same rate that evaporation occurs, thereby keeping the level of the liquid at the same height with respect to the vessel. The major disadvantage to this device is that, as the Dewar flask is raised, it surrounds more and more of the previously exposed portion of the vessel and traps the cold gas molecules as they evaporate from the cryogenic liquid, thereby shifting the gradient and creating uncontrolled temperature and pressure changes within the vessel.

Another device, described in U.S. Pat. No. 3,850,040, transfers fresh liquid to the Dewar flask at the same rate that evaporation occurs, so that the height of the liquid remains at a constant level. In this device the temperature gradient does not shift. The major disadvantage to this device is that, in humid climates, ice can accumulate within the valves and seals on the apparatus used to pump the liquid from the reservoir to the Dewar flask and can cause the device to fail.

Thus, there is a need for a simple device that maintains an evaporating liquid at a constant height in order to keep the gases within a vessel immersed in the liquid at a constant temperature.

SUMMARY OF THE INVENTION

The present invention solves the problems with prior art devices for maintaining gases within a vessel at constant temperature, by providing an apparatus which maintains a liquid at a fixed height surrounding the gas-containing vessel.

Generally described, the present invention is an apparatus for controlling the temperature within a vessel, comprising a container of liquid, wherein at least a portion of the vessel extends above the surface of the liquid; and means for conducting the liquid up to a predetermined point on the vessel regardless of changes in the level of the surface of the liquid.

More particularly described, the present invention is an apparatus for maintaining a sample contained in a vessel at a constant temperature, comprising a container of volatile cooling liquid in which the vessel is immersed, so that the vessel extends above the surface of the liquid; and means for conducting the liquid from the container along the vessel to a predetermined point on the vessel above the surface of the liquid, regardless of changes in the level of the surface of the liquid.

Preferably, the means for conducting the liquid up to a predetermined point on the vessel comprises capillary action and further comprises a wick including connected capillary passageways which extend from a point below the surface of the liquid to the predetermined point on the vessel. The capillary passageways of the wick preferably have an average diameter of about 20 microns when liquid nitrogen is the cryogenic liquid, and the predetermined point along the vessel is from 7 to 10 inches above the initial surface of the liquid.

The apparatus preferably comprises a sleeve-shaped wick, contacting the vessel and extending below the surface of the liquid, surrounded by an outer sleeve of material impervious to the liquid. The outer sleeve allows the wick material to be packed to a desired density, and it channels the wicked liquid along the vessel wall. The outer sleeve is preferably a thermal insulator. The wick and sleeve can also comprise one layer of material surrounding the vessel, with the inner region being porous and the outer surface fused into a heat insulating barrier, impervious to the liquid. The apparatus can further comprise a heat conducting sleeve surrounding the thermal insulating sleeve.

The wick, by conducting the liquid to a predetermined point on the vessel, surrounds the vessel with a wall of cold liquid and maintains the substances within the vessel, including gases, at a constant temperature. The insulating sleeve, surrounding the wick, keeps the liquid within the capillaries of the wick from evaporating from the sides of the wick, and thereby assists the wick in maintaining a constant temperature within the vessel. The heat conducting sleeve contributes an additional barrier between the wick and the varying temperature of the air outside of the wick and thus aids in keeping the temperature within the vessel constant. The heat conducting sleeve conducts heat from the air directly down to the liquid within the container and thus helps to prevent the conduction of heat into the vessel.

More particularly described, the liquid can comprise any of a great number of liquids provided they are of such a character and the ambient conditions are such that they evaporate relatively readily. An evaporating cooling liquid, such as liquid nitrogen, is a typical example. The wick can comprise one of many materials such as fibrous materials including refractory fibers, spun kaolin clay, and glass fibers; packed particles; or porous ceramic material or plastic. the conducting sleeve can comprise a heat conductive material or metal, such as copper, and the heat insulating sleeve can comprise a heat insulating material such as epoxy-filled woven glass filaments.

The present invention also provides a method of cooling a sample contained in a vessel, comprising the steps of immersing the vessel in a container of volatile cooling liquid with a portion of the vessel extending above the surface of the liquid, and conducting the liquid from the container along the vessel to a predetermined point along the length of the vessel above the surface of the liquid regardless of changes in the level of the surface of the liquid.

Thus, it is an object of the present invention to provide an improved apparatus for maintaining gases within a vessel at a constant temperature.

It is a further object of the present invention to provide an improved apparatus that uses an external liquid to maintain gases within a vessel at a constant temperature.

It is a further object of the present invention to provide an improved apparatus for maintaining gases within a vessel at a constant temperature without creating a varying temperature gradient outside of and within the vessel.

It is a further object of the present invention to provide an improved apparatus that compensates for the loss of an evaporating liquid without utilizing moving mechanical parts.

Other objects, features, and advantages of the present invention will become apparent upon reading the following detailed description of a preferred embodiment of the invention, when taken in conjunction with the drawing and the appended claims.

DETAILED DESCRIPTION

Figure 1:
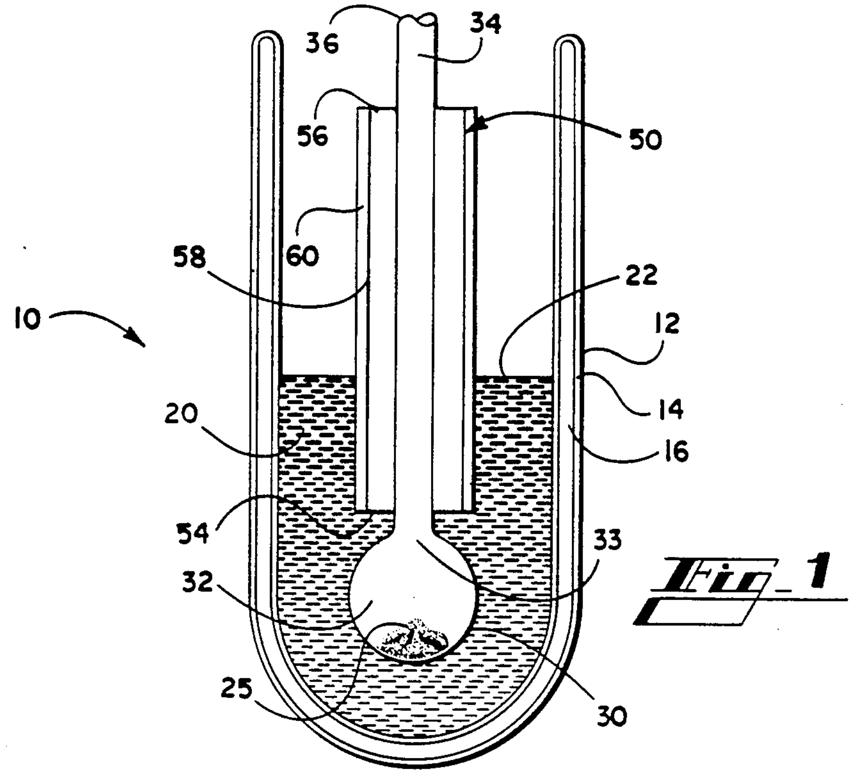
FIG. 1 is a vertical cross-sectional view of the temperature controlling apparatus embodying the present invention.

Referring now in more detail to the drawing, in which like reference numerals refer to like parts throughout the several views, FIG. 1 shows a temperature controlling apparatus 10 embodying the present invention. The apparatus includes a container 12, preferably an insulated container such as a Dewar flask, having an external wall 14 surrounding a vacuum chamber 16. It will be understood that any container capable of withstanding extremely hot or cold temperatures of the particular liquid to be placed therein, can be substituted for the Dewar flask, depending on the nature of the liquid to be held in the container.

The container 12 is partially filled with a liquid 20, preferably an evaporating cooling liquid such as liquid nitrogen. Liquid nitrogen is preferred for many applications because it boils at room temperature, maintaining a constantly cold temperature. The uppermost level of the liquid defines a horizontal surface 22 from which evaporating liquid, or vapor, escapes.

A rest sample 25 is placed into a vessel 30 for analysis. The vessel comprises a size and shape capable of being inserted within the liquid-filled container 12. The sample-containing vessel 30 is then immersed in the liquid 20 in the container 12. The preferred vessel 30 of the present invention includes a sphere 32 at the lowermost end of the vessel having an opening 33 connected to an elongated tube 34 extending upwardly from the sphere. The preferred vessel 30 thus can be a round-bottomed volumetric flask of the type commonly used in scientific laboratories. For some applications, such as continuous flow sample analysis, the sample vessel may be a U-shaped tube. The entire vessel is made of a substance capable of withstanding the temperature of the liquid into which it is immersed. Preferably, the vessel is made of a substance capable of withstanding extremely hot or cold temperature, such as PYREX ® brand glassware.

The sphere 32 of the sample-containing vessel 30 is normally immersed below the surface 22 of the liquid 20 as shown in FIG. 1. The elongated tube 34 may also be immersed partially below the surface 22 of the liquid and is removably attached at its uppermost end 36 to an analytical scientific instrument (not shown). The attached analytical instrument may be, for example, a pore volume and surface area analyzer such as a DigiSorb 2600 analyzer, manufactured by Micromeritics Instrument Corporation, 5680 Goshen Springs Road, Norcross, Ga. The pore volume and surface area of the sample 26 contained within the sphere 32 of the vessel 30 is determined according to the well known methods as described in U.S. Pat. No. 3,850,040. The principles of the DigiSorb 2600 analytic instrument are also described in U.S. Pat. No. 3,850,040.

As shown in FIG. 1, the elongated tube 34 of the vessel 30 is surrounded by a sleeve or wick 50. The wick 50 extends from beneath the surface 22 of the liquid 20 to a predetermined point seven to ten inches above the initial surface 22 of the liquid 20. The height of the wick 50 should be lower than the height of the walls of the container 12. The wick is comprised of a material including connecting capillary passageways such as cellulose, glass, spun kaolin clay, or refractory fibers; porous ceramic material; porous plastics; or any other porous material containing connecting capillary passageways. When the liquid 20 is liquid nitrogen, the capillary passageways of the wick 50 preferably comprise an average diameter of approximately twenty microns to promote efficient flow of liquid nitrogen up through the wick 50.

In the preferred embodiment of the present invention, a layer or sleeve 60, impervious to the liquid 20, surrounds the outer surface of the wick 50. The sleeve may extend below the surface 22 of the liquid 20 so that it fully covers the wick 50, but should not enclose the lowermost end 54 of the wick, enabling the liquid 20 to freely flow up into the connecting capillary passageways of the wick. Likewise, the impervious sleeve 60 should not completely enclose the uppermost end 56 of the wick 50. The uppermost end 56 of the wick should be vented into the atmosphere to allow gaseous molecules from the evaporating liquid 20 to escape, thus maintaining the upward capillary movement of the liquid 20 within the capillary passageways of the wick 50.

It will be understood that the temperature controlling apparatus of the present invention can comprise a wick without an impervious sleeve; however, the liquid 20 contained within the capillary passageways will not only evaporate from the uppermost end 56 of the wick 50, but will also evaporate unevenly from the side 58 of the wick where exposed to the warm air. Evaporation from the side 58 of the wick 50 decreases the efficiency of the wick and may cause a fluctuating temperature gradient at the upper end of the tube 34. It has been found that a short wick can operate efficiently without an impervious sleeve 60, but that a longer wick should be used with an impervious sleeve to obtain increased wick efficiency. Furthermore, the sleeve 60 allows the wick material to be packed into the sleeve to a density providing capillary passageways of a desired average size.

The impervious sleeve 60, surrounding the wick 50, comprises either a heat insulating material such as epoxy-filled woven glass filaments, or a heat conducting material such as metal, preferably copper. It will be understood that any impervious material capable of withstanding extremely hot or cold temperatures, as required, can be substituted for the glass filaments or copper. Use of the heat insulating sleeve is preferred for surrounding short or medium length wicks. The heat insulating sleeve inhibits evaporation from the side 58 of the wick, but some heat diffuses through the insulating material from the air to the wick, permitting evaporation at a point below the top of the wick and decreasing the efficiency of the wick 50. A major advantage to the heat insulating sleeve is that, because it does not conduct heat, it conserves the use of the liquid 20 in the container 12 as explained below. On the other hand, a heat conducting material, such as copper, may be preferred for use with long wicks. Greater evaporation of the cooling liquid will occur, however. The heat conducting material provides a more nearly isothermal layer against the wick 50 by conducting the heat in the air away from the wick directly down to the cold liquid 20. This allows the liquid 20 to travel to a greater height within the wick 50 before evaporation occurs. The disadvantage to using this heat conducting material is that the heat conducted into the liquid 20 heats the liquid, causing it to evaporate at a faster rate from the surface 22.

Although the present apparatus can be manufactured on any appropriate scale, it has been found that a wick 50 and a sleeve 60 both having a length of up to fourteen inches is practical and efficient for use with pore volume and surface area analyzers.

Figure 2:
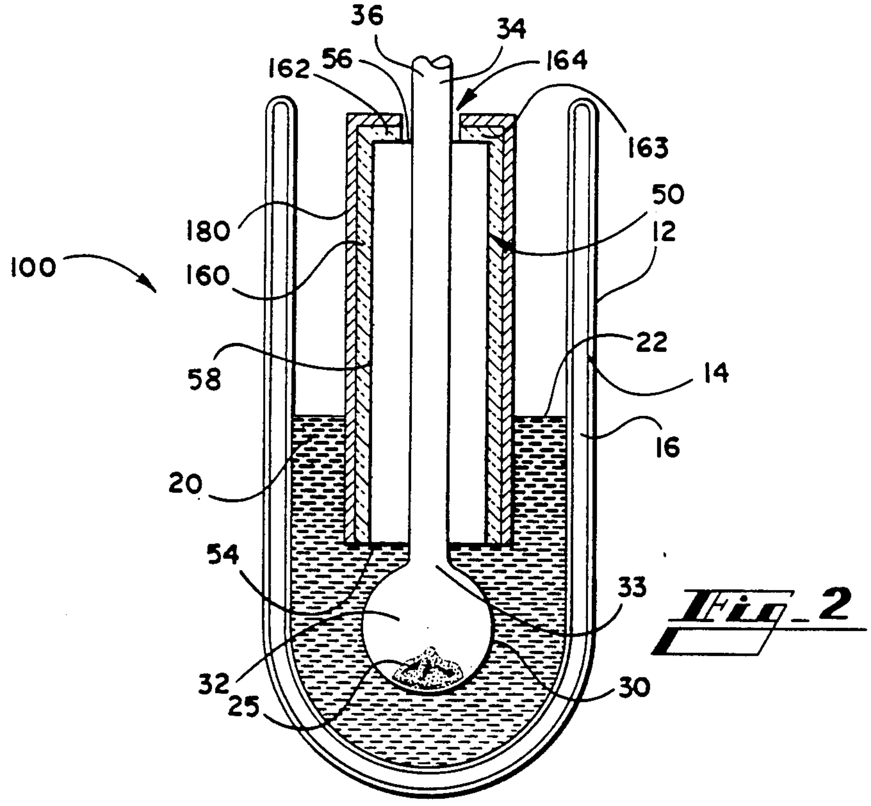
FIG. 2 is a vertical cross-sectional view of a second embodiment of the present invention.

A second embodiment of the present invention, shown in FIG. 2, is a multi-layered temperature controlling apparatus 100. FIG. 2 is a vertical cross-sectional view similar to that shown in FIG. 1 for the first embodiment. In the second embodiment, the container 12, liquid 20, sample 25, vessel 30, and wick 50 are similar to that for the first embodiment shown in FIG. 1; however, a modified sleeve 160 is provided. The modified sleeve 160 defines a lip 162 extending inwardly at a right angle to the sleeve 160. The purpose of the lip 162 is to inhibit some of the unnecessary evaporation of the liquid from the uppermost end 56 of the wick. The lip 162 extends from the uppermost edge 163 of the sleeve to a predetermined point spaced away from the external wall of the vessel 30, defining an annular space 164 between the vessel 30 and lip 162 through which evaporating liquid can escape. Preferably, the modified sleeve 160 comprises a heat insulating material such as epoxy-filled woven glass filaments having the properties described above.

A heat conducting sleeve 180 surrounds the modified heat insulating sleeve 160 and the lip 162 of the modified sleeve, and conducts the heat from the warm ambient air down to the cold liquid 20 within the container 12. Alternating layers, as shown, increase the liquid transport action of wick 50. It will be understood that further alternating layers of heat conducting material and heat insulating material may surround the wick 50.

Figure 3:
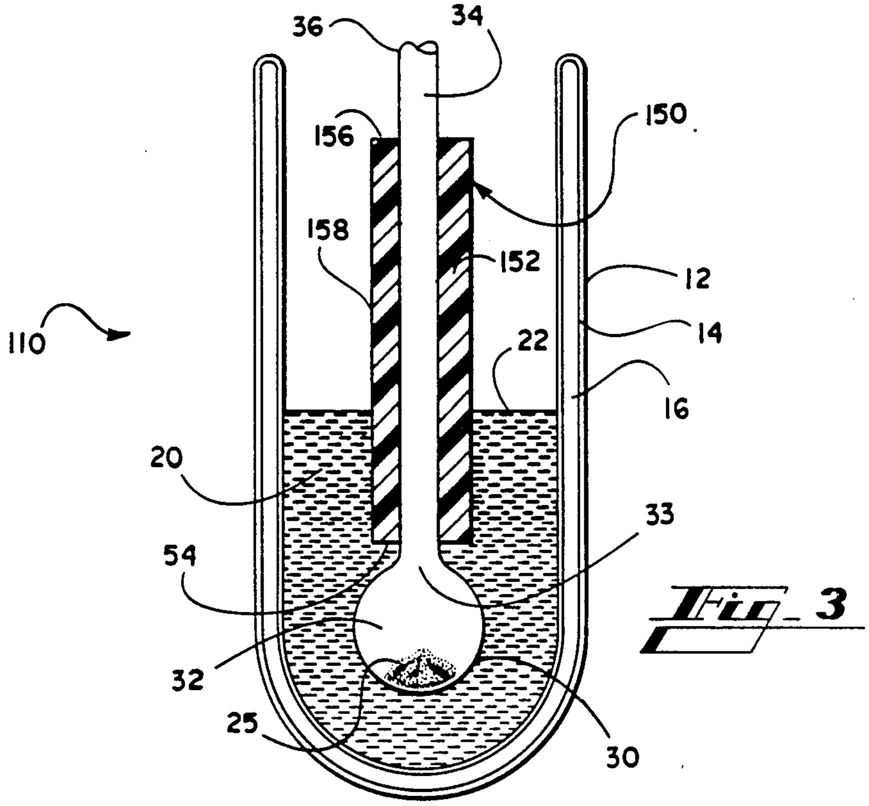
FIG. 3 is a vertical cross-sectional view of a third embodiment of the present invention.

A third embodiment of the present invention, shown in FIG. 3, is a single-layered temperature controlling apparatus 110. FIG. 3 is a vertical cross-sectional view similar to that shown in FIG. 1 for the first embodiment. In the third embodiment, the wick and heat insulating sleeve are integrally formed of one material. The wick 150 has an inner region 152 which is porous, and the outer surface 158 of the inner region is fused or otherwise formed into a barrier, impervious to the liquid 20. The uppermost end 156 of the wick is not fused to allow gaseous molecules from the evaporating liquid 20 to escape.

The wick 150 comprises a porous material that can be formed with a dense layer on its outer surface. Such material is preferably porous plastic, which can be fused on its outer surface 158, for example by the application of heat.

The temperature controlling appartus 10, of the preferred embodiment of the present invention, shown in FIG. 1, can be used for pore volume and surface area analysis according to the following procedure. Before the vessel 30 is immersed in the liquid 20 contained within the container 12, the wick 50 is inserted over the uppermost end 36 of the vessel 30 so that it covers as much of the tubular portion 34 of the vessel 30 as possible, preferably completely covering the lower end of the tube 34 adjacent to the sphere 32. The heat insulating or heat conducting sleeve 60 or 160 is fitted over the wick, along with any additional insulating or conducting layers, either before or after the wick is installed. The sample 25 is placed within the sphere 32 of the vessel 30 at any convenient time, prior to the attachment of the uppermost end 36 of the vessel to the appropriate pore volume/surface area analyzer. The attached vessel 30 is then either lowered into the liquid 20 or the container 12 is raised so that the wick 50 extends below the surface 22 of the liquid enabling the liquid to pass upwardly by capillary action through the capillary passageways within the wick 50 toward the uppermost end 56 of the wick.

The liquid 20 within the capillary passageways of the wick 50 remains at the same predetermined height with respect to the vessel 30 regardless of the height of the surface 22 of the liquid in the container 12, as long as the lowermost end 54 of the wick is in contact with the liquid 20. Therefore, a change in the volume of the liquid 20 in the container due to evaporation of the liquid, will not affect height of the liquid 20 within the wick 50 surrounding the tube 34 of the vessel. The height of the liquid 20 within the wick will be determined by various factors including the diameter, composition and height of the wick; the capillary nature and temperature of the liquid; the atmospheric pressure; and the efficiency of any existing isothermal or insulating sleeves.

The cold liquid 20 within the wick surrounding the vessel 30 keeps the vessel and the gases within the tube 34 of the vessel 30 at a constant temperature. Any change in the pressure within the vessel 30 must therefeore be attributed solely to the adsorption of gas by the sample 25, provided the vessel 30 is sealed and remains so. The amount of gaseous adsorption by the sample is normally plotted on a graph, producing a BET curve for that particular sample which can be mathematically converted into a value representing the pore volume or surface area of the sample.

As described above, the heat conducting and heat insulating sleeves surrounding the wick 50 increase the efficiency of the wick by providing an impermeable barrier around the wick, preventing evaporation of liquid 20 from the side 58 of the wick 50. The heat conducting sleeve also conducts heat from the air directly down to the liquid 20 in the container 12, such sleeve preventing a large amount of the external heat from entering the wick 50. If the wick is surrounded by multiple sleeves, as shown in FIG. 2 and described above, the amount of heat entering the wick is significantly reduced. The heat in contact with the heat conducting sleeve 180 is conducted to the liquid 20 in the container 12, reducing the heat input to the heat insulating sleeve 160 by a large amount. The heat insulating sleeve 160 retards an additional amount of the heat, depending on the thickness and quality of the insulating material comprising the insulating sleeve. Therefore, only a small quantity of the heat from the air passes through to the wick 50, causing a small amount of the liquid in the wick to evaporate out of the uppermost end 56 of the wick. As evaporation occurs, more cold liquid 20 moves upwardly in the capillary passageways of the wick 50 by capillary action, maintaining a constant temperature within the vessel 30. In reality, extremely slight temperature fluctuations might occur within the vessel 30 because it is impossible to achieve one hundred percent efficiency; however, these slight fluctuations should have little effect on the surface area or pore volume measurement.

The temperature controlling apparatus of the present invention provides several unique advantages which overcome the disadvantages encountered in the prior art. The height of the liquid 20 surrounding the sample-containing vessel 30 remains constant due to the capillary action of the wick 50, facilitating unattended scientific analyses. A laboratory technician or automated machine is therefore not needed to replace the constantly evaporating liquid 20. The present invention does not have moving mechanical parts, and thus overcomes many of the problems encountered in the prior art.

While this invention has been described in detail with particular reference to a preferred embodiment thereof, it will be understood that variations and modifications can be made without departing from the spirit and scope of the invention as described herein and as defined in the following claims.

We claim:

1. A method of cooling a sample contained in a vessel, comprising the steps of:
   immersing said vessel in a container of volatile cooling liquid with a portion of said vessel extending above the surface of said liquid; and
   conducting said liquid from a location at or below the surface of said liquid in said container along said vessel to a predetermined point along the length of said vessel, said point being above the surface of said liquid, regardless of changes in the level of the surface of said liquid.

2. The method of claim 1 wherein said step of conducting said liquid along said vessel comprises conducting said liquid by capillary action.

3. The method of claim 2, further comprising the step of thermally shielding said liquid being conducted along said vessel from ambient temperature.

4. The method of claim 3, wherein said step of shielding said liquid from ambient temperature comprises conducting ambient heat to the surface of said liquid in said container.

5. An apparatus for cooling a sample contained in an elongate vessel, comprising:
   a container of volatile cooling liquid, said vessel being immersed in said liquid and extending above the surface of said liquid; and
   means for conducting said liquid from a location at or below the surface of said liquid in said container along said vessel to a predetermined point along the length of said vessel, said point being above the surface of said liquid, regardless of changes in the level of the surface of said liquid.

6. The apparatus of claim 5, wherein said means for conducting said liquid comprises means for conducting said liquid by capillary action.

7. The apparatus of claim 6, wherein said means for conducting said liquid by capillary action comprises a wick including connected capillary passageways and extending from below the surface of said liquid to said predetermined point.

8. The apparatus of claim 7, wherein said capillary passageways have an average diameter of about 20 microns.

9. The apparatus of claim 7, further comprising a thermally insulating layer contacting the outer surface of said wick and extending below the surface of said liquid.

10. The appartus of claim 7, wherein said wick comprises a sleeve surrounding said vessel, and further comprising:
   an insulating sleeve surrounding the outer surface of said wick; and a heat conducting sleeve surrounding said first insulating sleeve.

11. The apparatus of claim 10, wherein said insulating sleeve comprises epoxy-filled woven glass filaments.

12. The apparatus of claim 11, wherein said heat conducting sleeve comprises a heat conductive metal.

13. The apparatus of claim 12, wherein said metal comprises copper.

14. The apparatus of claim 7, wherein said wick comprises fibrous material.

15. The apparatus of claim 14, wherein said wick comprises refractory fibers.

16. The apparatus of claim 14, wherein said wick comprises spun kaolin clay.

17. The apparatus of claim 14, wherein said wick comprises glass fibers.

18. The apparatus of claim 14, wherein said wick comprises cellulose fibers.

19. The apparatus of claim 7, wherein said wick comprises packed particles.

20. The apparatus of claim 7, wherein said wick comprises porous ceramic material.

21. The apparatus of claim 7, wherein said liquid comprises liquid nitrogen.

22. The apparatus of claim 7 wherein said wick comprises a material capable of retaining capillary properties upon being cooled to the temperature of liquid nitrogen.

23. The apparatus of claim 7, wherein said wick comprises a sleeve surrounding said vessel, and further comprises an outer sleeve of material impervious to said liquid, surrounding said wick.

24. The apparatus of claim 23, wherein said outer sleeve comprises a heat insulating material.

25. The apparatus of claim 24, wherein said outer sleeve comprises epoxy-filled woven glass filaments.

26. The apparatus of claim 24, wherein said outer sleeve comprises a refractory material.

27. The apparatus of claim 24, wherein said wick and sleeve are one with the inner region being porous and the outer surface fused into an impermeable barrier.

28. The apparatus of claim 23, wherein said outer sleeve comprises a heat conducting material.

29. The apparatus of claim 23, wherein said outer sleeve comprises an impervious layer formed of the material of said wick.

30. The apparatus of claim 5, wherein said predetermined point is as much as 10 inches above the surface of said liquid.

31. The apparatus of claim 5, wherein said liquid comprises liquid nitrogen.

32. An apparatus for cooling a sample contained in an elongate vessel comprising:

a container of a volatile cooling liquid, said vessel being immersed in said liquid and extending above the surface of said liquid; and conducting means for conducting said liquid from a location at or below the surface of said liquid in said container to a predetermined point along the length of said vessel, said point being above the surface of said liquid, regardless of changes in the level of the surface of said liquid, said conducting means extending, during conduction of said liquid, from a location at or below the surface of said liquid to said point.

33. A method of cooling a sample contained in a vessel, comprising the steps of:

immersing said vessel in a container of a volatile cooling liquid with a portion of said vessel extending above the surface of said liquid; and conducting said liquid from a location at or below the surface of said liquid in said container along said vessel to a predetermined point along the length of said vessel, said point being above the surface of said liquid, regardless of changes in the level of the surface of said liquid, while said container contains at least a predetermined minimum amount of said liquid.

* * * * *